United States Patent [19]

Fluegge

[11] Patent Number: 4,690,428
[45] Date of Patent: Sep. 1, 1987

[54] DOUBLE ISOLATED JOUNCE BUMPER SYSTEM

[75] Inventor: Jerry H. Fluegge, Manitou Beach, Mich.

[73] Assignee: Ford Motor Company, Dearborn, Mich.

[21] Appl. No.: 671,645

[22] Filed: Nov. 15, 1984

[51] Int. Cl.$^4$ .............................................. B60G 3/00
[52] U.S. Cl. .................................. 280/697; 267/33; 267/292; 280/715; 280/716; 280/724
[58] Field of Search ............... 280/670, 671, 697, 701, 280/715, 716, 711; 267/33, 140, 63 R

[56] References Cited

U.S. PATENT DOCUMENTS

| | | | |
|---|---|---|---|
| 2,179,856 | 11/1939 | Leighton | 29/149.5 R |
| 2,660,449 | 11/1953 | MacPherson | 280/665 |
| 2,980,417 | 4/1961 | Pence | 267/33 |
| 2,999,524 | 9/1961 | Marison | 267/33 |
| 3,037,793 | 6/1962 | Gouirand | 280/711 |
| 3,069,149 | 12/1962 | Neff | 267/33 |
| 3,086,792 | 4/1963 | Schultz | 267/33 |
| 3,111,307 | 11/1963 | Cuskie | 267/20 R |
| 3,149,855 | 9/1964 | Adloff et al. | 280/669 |
| 4,118,019 | 10/1978 | Weir | 267/63 R |

FOREIGN PATENT DOCUMENTS 1170257 9/1961 Fed. Rep. of Germany .
1924175 5/1969 Fed. Rep. of Germany .

Primary Examiner—John J. Love
Assistant Examiner—Kenneth R. Rice
Attorney, Agent, or Firm—Jerome R. Drouillard; Roger L. May

[57] ABSTRACT

A double isolated jounce bumper system comprises first and second shaped members mounted upon the chassis and a control arm of a motor vehicle, respectively. Each shaped member comprises a rigid armature and an elastomeric covering and bears a shape which is complementary to the shape of the other.

5 Claims, 4 Drawing Figures

DOUBLE ISOLATED JOUNCE BUMPER SYSTEM

BACKGROUND OF THE INVENTION

1. Field of the Invention

This invention relates generally to a double isolated jounce bumper system for use in wheel suspensions for motor vehicles.

2. Disclosure Information

Automotive suspension systems almost universally include mechanisms which permit the roadwheels to travel upward in a direction toward the vehicle's body in the event that an obstruction is encountered in the roadway. Although such vertical displacement of the roadwheels is a desirable characteristic of a suspension system, provisions must be made within the system to limit the maximum displacement in an upward direction. This limitation is typically imposed upon the suspension system by an elastomeric snubber most often termed a "jounce bumper". The term "jounce" refers to movement of the suspension in an upward direction. Thus, "full jounce" means that the suspension is in its uppermost position wherein part of the suspension impinges upon the jounce bumper.

Jounce bumpers have been in wide use for many years in motor vehicles and have been mounted on suspension arms as in U.S. Pat. No. 2,179,856, or upon the chassis or body as in U.S. Pat. Nos. 2,660,449, and 3,149,855. U.S. Pat. No. 3,111,307 discloses yet another construction in which bumpers are mounted to both the chassis and to a lower control arm. In German Pat. Nos. 1,170,257 and 1,924,175, a jounce bumper mounted upon a frame member contacts a concave section formed in a control arm during full jounce.

In the case of the present invention, a jounce bumper system comprises two elastomeric bumpers having rigid cores and complementary, nesting shapes. The two constituent bumpers may be incorporated into spring isolators for coil spring equipped suspensions. The present jounce bumper system is double isolated because unlike conventional systems in which an elastomeric bumper directly contacts a frame member or the like during full jounce, the present system always maintains a rubber-to-rubber contact. This is advantageous in that the ride harshness of the vehicle may be reduced and the life of the jounce bumper system increased.

SUMMARY OF THE INVENTION

In accordance with the present invention, a double isolated jounce bumper system is intended for use in an automotive suspension comprising a chassis, a wheel carrier, a roadwheel and tire assembly and one or more control arms pivotally attaching the wheel carrier to the chassis. The jounce bumper system comprises first and second members. The first member is attached to the chassis and the second member is attached to a suspension component, such as a lower control arm, which is subject to vertical displacement during suspension jounce. Each member comprises a base and a projection extending therefrom.

The projections are shaped to allow complementary engagement with each other during full jounce. Each projection is comprised of a rigid armature covered with elastomeric material. The projections desirably have a circular cross section. The elastomeric coverings may be clamped to their respective armatures by a coil suspension spring and in this case the spring will also serve to isolate the spring from the chassis and control arm.

The jounce bumper system of the present invention offers yet another advantage inasmuch as its piloted design prevents the bumper from shifting during severe loading. This shifting or squirming of the bumper during heavy impact could, in some other designs, cause both failure of the bumper and damage to the suspension.

DETAILED DESCRIPTION OF THE DRAWINGS

DETAILED DESCRIPTION OF THE PREFERRED EMBODIMENT

Figure 1:
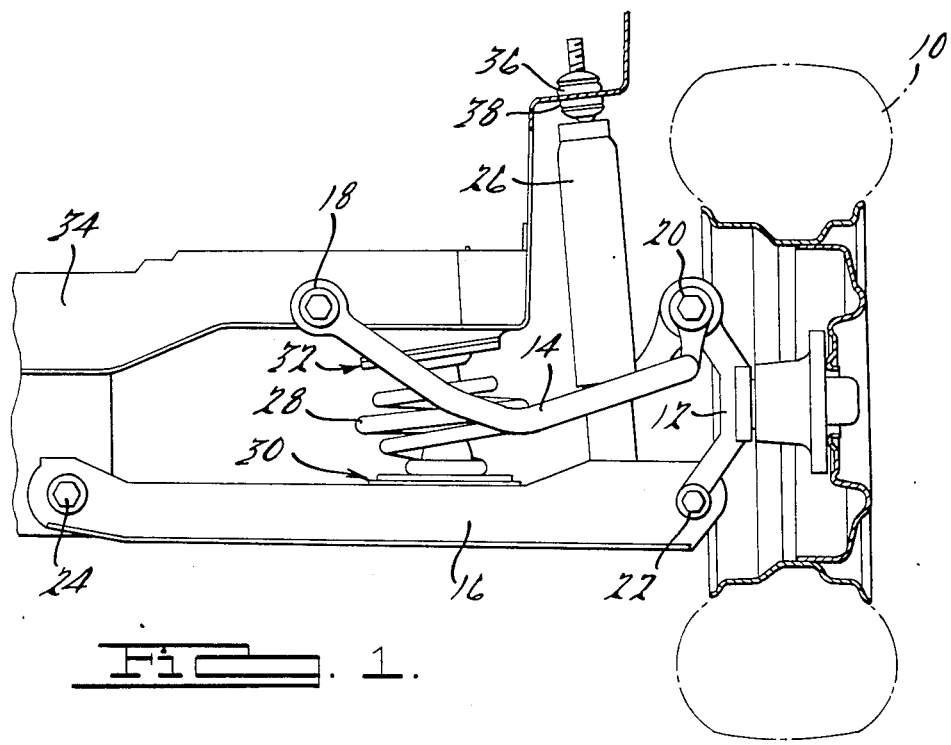
FIG. 1 is a front elevational view of an automotive suspension incorporating the jounce bumper system of the present invention.
Figure 2:
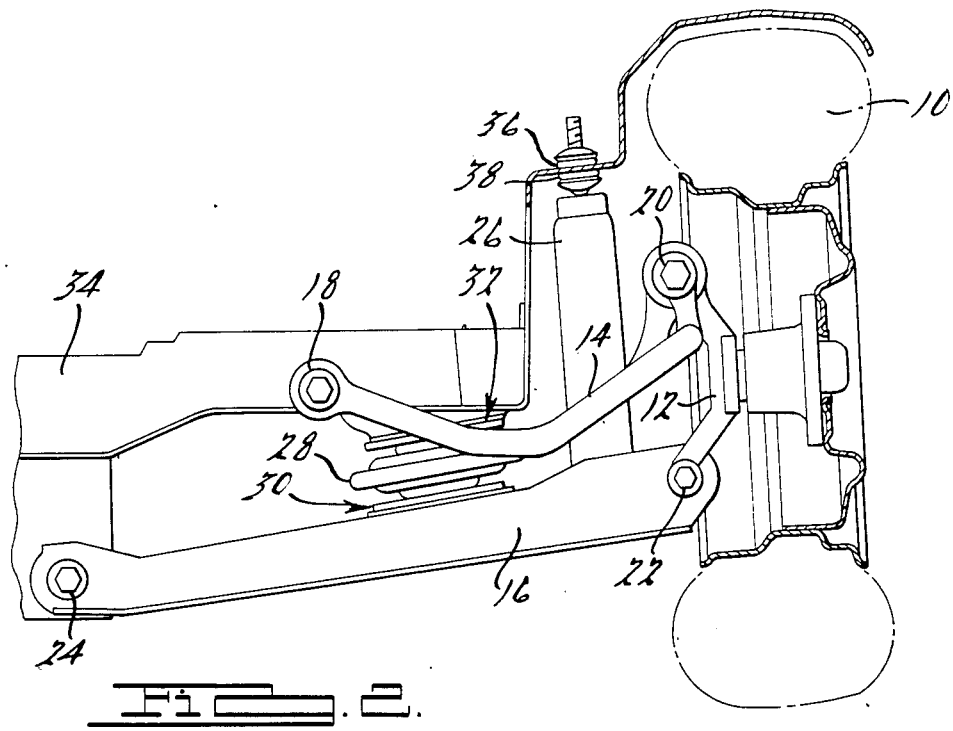
FIG. 2 is a front elevational view of the automotive suspension of FIG. 1 in the full jounce position.

FIGS. 1 and 2 show an automotive suspension incorporating the jounce bumper system of the present invention at both normal ride height and full jounce, respectively. As shown in FIGS. 1 and 2, an example of a short-long arm suspension suitable for use with the jounce bumper system of the present invention comprises a roadwheel and tire assembly 10 rotatably attached to wheel carrier 12 which is in turn pivotally attached to chassis 34 by upper control arm 14 and lower control arm 16. Upper control arm 14 is pivotally attached to chassis 34 at its inboard end 18 and pivotally attached at its outboard end 20 to wheel carrier 12. Lower control arm 16 is pivotally attached at its inboard end 24 and its outboard end 22 to chassis 34 and wheel carrier 12 respectively. Each of the pivots shown is of the type commonly known to those skilled in the art of automotive suspensions as the so-called "silent block" design in which an inner sleeve which may be comprised of steel is surrounded by an annular bushing of an elastomer such as natural rubber compounds and a larger steel sleeve. Each pivot bushing is retained by a nut and bolt or other fastening means.

Shock absorber 26 is interposed between lower control arm 16 and chassis 34. The upper end of shock absorber 26 is mounted to chassis 34 by means of resilient insulators 36 and 38 and its lower end (not shown) is mounted in a similar manner.

Figure 3:
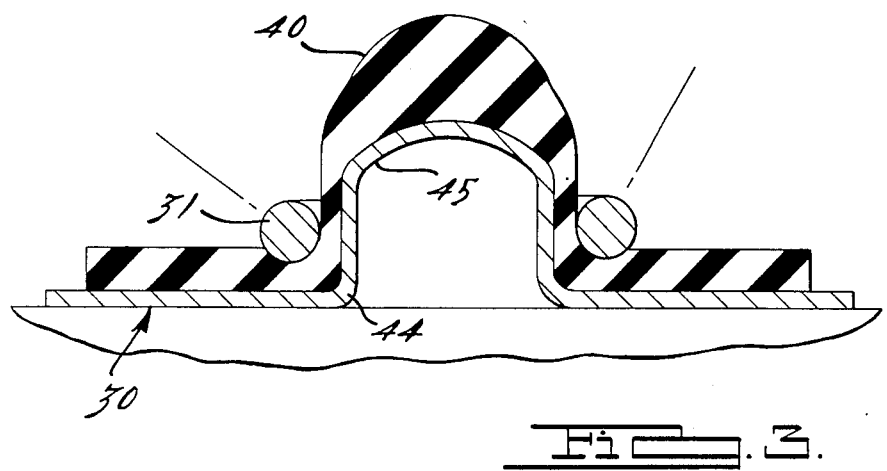
FIG. 3 is a sectional view of one of the two members comprising the jounce bumper system of the present invention.
Figure 4:
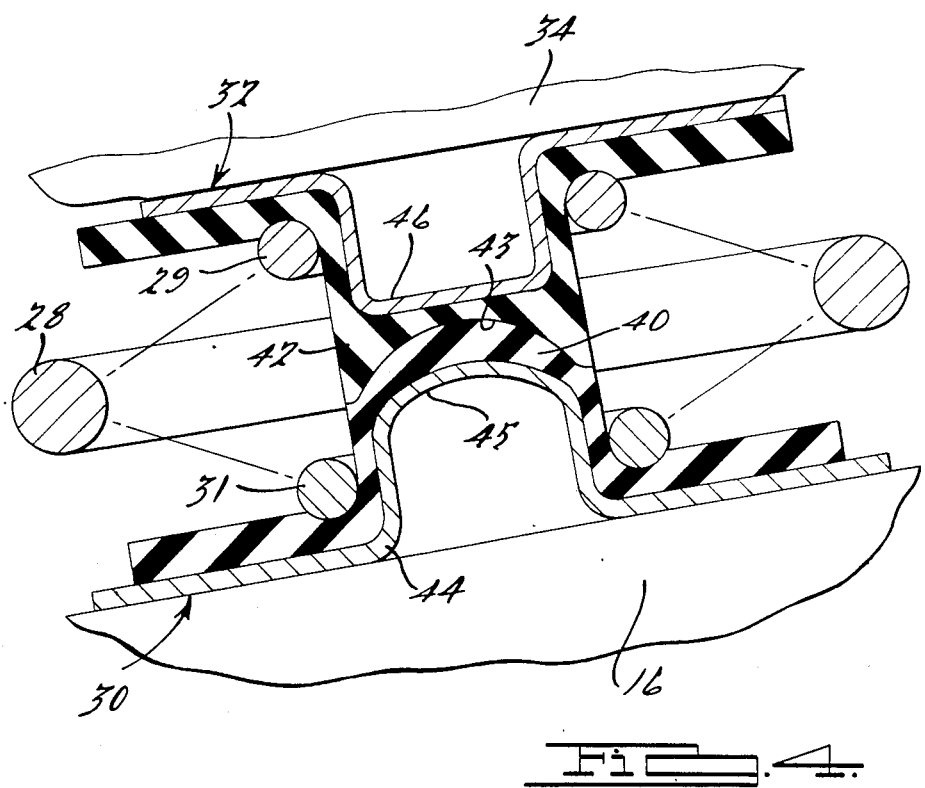
FIG. 4 is a sectional view of the two members comprising the jounce bumper system of the present invention shown in the full jounce position.

Suspension spring 28 is mounted between lower control arm 16 and chassis 34. The jounce bumper assembly of the present invention is shown in FIGS. 1 and 2 as being mounted at either end of suspension spring 28. Detailed construction of the two members comprising the jounce bumper system is shown in FIGS. 3 and 4. First member 32 is attached to chassis 34 and comprises armature 46 which may, for example, be comprised of a steel stamping spot welded to chassis 34 or fastened to chassis 34 in some other suitable manner. Elastomeric cover 42 is held in clamping engagement with armature 46 by upper end 29 of suspension spring 28.

Second member 30 of the jounce bumper system of the present invention comprises armature 44 which terminates in convex faced projection 45. Second member 30 further comprises elastomeric cover 40 which has a spherical projection sized so as to provide a complementary fit with the hemispherical indentation 43 formed in elastomeric cover 42. Lower end 31 of coil spring 28 holds elastomeric cover 40 in clamping engagement with armature 44. As can be seen in FIGS. 2 and 4, when the suspension undergoes full jounce—i.e., when wheel and tire assembly 10 is displaced vertically upward to its maximum extent, the jounce bumper members fully engage each other in a complementary manner, thereby preventing any other members of the suspension or chassis from contacting in an unwanted manner. Because first member 32 receives second member 30 into its hemispherical indentation, member 30 is not subject to failure due to squirming.

It is to be understood that jounce bumper assembly of the present invention may be used with or without a coil spring and with or without a short-long arm type of suspension. This jounce bumper system is adaptable for use with any suspension in which a movable component is displaceable relative to the chassis during suspension jounce. In the event that a coil spring is not mounted between the jounce bumper members, the armatures may be retained by appropriated fasteners such as bolts or screws, or by adhesives, or by any other appropriate means. Alternatively, the armatures may comprise an integral part of the components with which they are associated. For example, a stamped steel control arm could include an integral, drawn, armature.

The term "chassis", when used in the specification and claims, will be understood to refer to either a conventional vehicle chassis or to a conventional unitary chassis and body construction, and it is intended to include vehicle structure and components connected to or supported upon the chassis structure and forming part of the sprung portion of the vehicle.

Although the present invention has been fully described in connection with the preferred embodiments thereof with reference to the accompanying drawings, it is to be noted that various changes and modifications will be apparent to those skilled in the art. Such changes and modifications are to be understood as included in the true scope of the present invention.

I claim:

1. A motor vehicle suspension comprising a chassis, a wheel carrier, a roadwheel and tire assembly and one or more control arms pivotally attaching said wheel carrier to said chassis, characterized in that the suspension includes a jounce bumper system comprising:
    (A) a first member comprising:
        (i) a base attached to said chassis; and
        (ii) a shaped projection depending from said base;
    (B) a second member engageable with said first member during full suspension jounce, comprising:
        (i) a base attached to a suspension component subject to vertical displacement during suspension jounce; and
        (ii) a projection attached to and extending upwardly from said base and shaped so as to permit complementary interlocking engagement with said projection depending from said first member;
    (C) said projections each comprising a rigid armature, a portion of which also forms said base, and a covering of elastomeric material fitted over at least part of said armature.

2. The motor vehicle suspension of claim 1 wherein said projections have a circular cross section.

3. The motor vehicle suspension of claim 1 wherein said second member is attached to the upper surface of a lower suspension control arm.

4. The motor vehicle suspension of claim 1 wherein said coverings of elastomeric material are clamped to said armatures by a coil spring interposed between the member attached to said lower suspension control arm and the member attached to said chassis so as to isolate said coil spring from said control arm and said chassis.

5. The motor vehicle suspension of claim 1 wherein the projection of one of said members comprises a cylinder having a first end attached to the base of said member and a second end having a hemispherical shape and the projection of the other of said members comprises a cylinder having a first end attached to the base of said member and a second end having a hemispherical indentation therein sized so as to allow complementary interlocking engagement with said hemispherically shaped projection.

* * * * *